May 13, 1958 — W. H. SCOTT — 2,834,399
SWIVEL SEAT
Filed Jan. 13, 1955
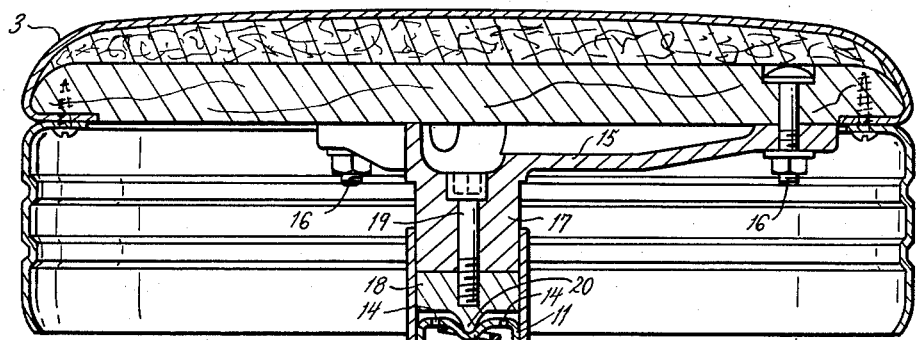
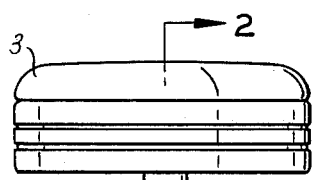
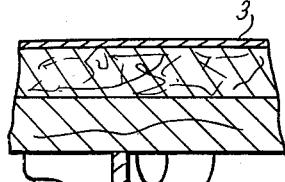
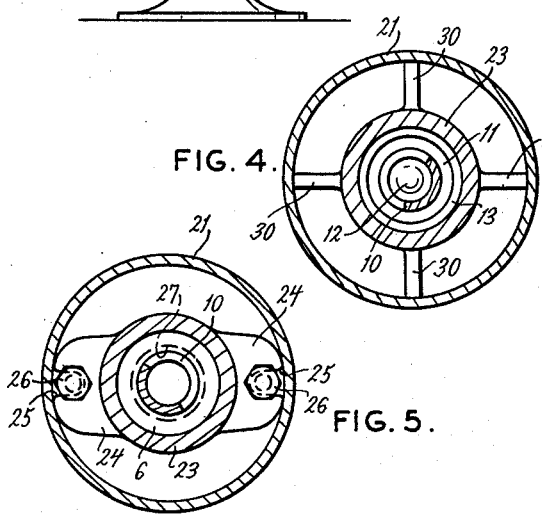
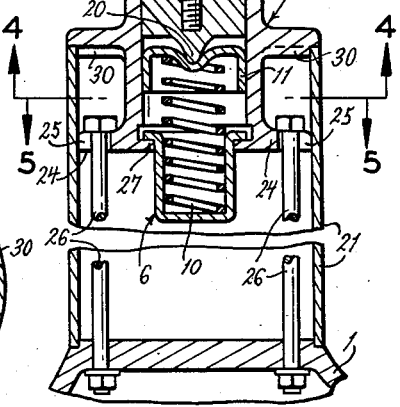
INVENTOR.
WILMOT H. SCOTT
BY
ATTORNEY

United States Patent Office 2,834,399
Patented May 13, 1958

2,834,399

SWIVEL SEAT

Wilmot H. Scott, Clayton, Mo.

Application January 13, 1955, Serial No. 481,677

4 Claims. (Cl. 155—95)

This invention pertains to seats such as are used in booths and at counters of restaurants and eating places and places where soft drinks are served. This invention is an improvement on the seat structure shown in my former patent, No. 2,618,315, issued November 18, 1952.

An object of this invention is to provide a simple structure whereby a spring may be incorporated in such a seat structure so that the seat may be resiliently supported.

Further objects will appear from the following description, taken in connection with the accompanying drawings, in which—

Fig. 1 is a view in elevation of one form of seat embodying this invention;

Fig. 2 is an enlarged section on line 2—2 of Fig. 1;

Fig. 3 is a section similar to Fig. 2, showing a modified structure adapted to another form of seat support;

Fig. 4 is a section on line 4—4 of Fig. 3; and

Fig. 5 is a section on line 5—5 of Fig. 3.

Referring to the drawing, the seat shown in Fig. 1 comprises a base 1, an upright tubular support 2, and a seat 3, mounted thereon. As shown in Fig. 2, the support 2 is formed with a groove 4 near its upper end. This groove extends circumferentially around the tube support 2 and is formed by pressing the material inward to provide an inner projection in the form of a bead 5, as clearly shown in this figure. The inner projection 5 forms a support for a spring holder indicated generally at 6. In the form shown in Fig. 2, the holder 6 is cup-shaped, having a bottom 7, axially extending cylindrical sides 8, and an outstanding flange 9 at its open end. As shown in Fig. 2, the flange 9 is fitted to the inside of the tube 2 and rests upon the inner projection 5 to be supported thereby.

Supported by the holder 6 is a coil spring 10. This spring rests upon the bottom 7 of the holder and is centered in the tube 2 by the walls 8 of the holder. Said walls also provide lateral support for the spring against buckling under compression. Said spring in turn supports a cup-shaped ball-socket member, indicated generally at 11. This member is formed with an indentation in its top, forming a ball-socket 12, and its side portions or flanges 13 are slidably fitted in the supporting tube 2. This ball-socket member may be provided with holes 14 adapted to receive hooks or other manipulating devices for inserting the member in the tube 2 or removing it therefrom.

The seat 3 is supported by a seat bracket 15 attached thereto in any suitable manner, as by bolts 16, and has a central shank 17. In the structure shown, the shank 17 has an end portion 18 attached thereto by a cap screw 19. The member 18 has formed at its lower end a ball-shaped swivel member 20 whose lower end is formed to hemispherical shape to fit the ball socket 12. This swivel member 20 may be formed on the lower end of the shank 17 itself. The shank 17, which is also slidably fitted in the tube 2, is thus supported by the swivel 20 on the ball-socket member 11. The seat is thus supported rotatably, the shank 17 rotating in the tube 2 as the swivel 20 turns in the ball-socket 12.

The spring 10 is dimensioned both as to its size and its compressive strength so that when the spring is compressed by a weight on the seat 3, the ball-socket member 11 may slide downward in the tube 2 until its flange 13 engages the flange 9 of the spring holder. This arrests the downward movement of the ball-socket member 11 and of the seat supported thereby, and limits the compression of the spring 10. This spring is ordinarily made of such strength as to cause a weight somewhat less than that of the average adult person to compress the same until the ball-socket member engages the spring holder. The invention thus provides a cushioned seat which, at the same time is steady without any tendency to bounce when an adult person is seated thereon.

The embodiment of Figs. 3, 4, and 5 is adapted to the type of seat where an enlarged supporting tube 21 is used. In this embodiment, an end bracket, indicated generally at 22, is mounted at the top of the tube 21. This bracket is formed with a central tubular member 23 forming a tubular support similar to the tube 2 of Figs. 1 and 2. The lower end of the bracket is provided with ears 24 having notches 25 adapted to receive bolts 26 by which the same may be secured to the base 1, as shown in Fig. 3. But this bracket may be provided with radiating arms 30 adapted to center it in the tube 21. The bracket 22 also has a flange 27 projecting inward to form an inner supporting projection similar to the bead 5 of Fig. 2 to support the spring holder 6 in a similar manner. In this embodiment, the spring 10, the ball-socket member 11, and the shank 17 with its ball swivel 20, are mounted in the tubular guide member 23 in the same manner as above described for mounting them in the tube 2. Thus, the bracket 22 provides means for adapting the improved structure to a larger size supporting tube 21.

It will be seen that the invention provides a simple structure whereby a cushioning spring may be added to a swivel seat of the type here involved. The spring holder supports and centers the spring, which in turn supports the ball-socket. Since said socket is slidable in the tubular guide support, it may move up and down under any weight imposed upon the seat 3, whereby the spring will be compressed until the ball-socket engages the spring holder, whereupon further compression of the spring is prevented and a solid support for the seat is provided.

Various changes may be made in the details of construction, within the scope of the appended claims, without departing from the spirit of this invention. Parts of the invention may be used without the whole and improvements may be added while retaining some or all of the advantages of the invention.

I claim:

1. In a seat of the character described having an upright tubular support; an internal supporting projection formed on said support intermediate its ends, a spring holder having a flange supported on said projection, a spring supported on said holder, said holder having an axially extending portion positioned to center said spring and support the same against buckling, a ball-socket supported by said spring and having a peripheral flange slidably guided in said tubular support, said ball-socket being engageable with said holder after a predetermined compression of said spring to limit such compression, and a seat bracket having a ball-swivel engaging said ball-socket and supported thereby in said tubular support.

2. In a seat of the character described having an upright tubular support; an internal supporting projection formed on said support intermediate its ends, a cup-shaped spring holder having an outstanding flange at its open end supported on said projection, a spring supported in said holder, a ball-socket supported by said spring and having a down-turned peripheral flange slidably guided in said tubular support, said last flange being dimensioned to engage said cup flange after predetermined compression of said spring, and a seat bracket having a shank rotatably fitted in said tubular support and formed at its end with a ball-swivel engaging said ball-socket and supported thereby.

3. In a seat of the character described having an upright tubular support; an end bracket secured in said support at the upper end thereof and having an upright tubular guide formed with an inner supporting projection, a spring holder within said guide supported by said projection, a coil spring supported on said holder, said holder having an axially extending portion positioned to center said spring and support the same against buckling, a ball-socket supported by said spring and guided by said tubular guide, said spring being dimensioned to permit said ball-socket to engage said holder after a predetermined compression of said spring to limit such compression, and a seat bracket having a ball-swivel engaging said ball-socket and supported thereby in said tubular guide.

4. In a seat of the character described having an upright tubular support; an internal supporting projection formed on said support intermediate its ends, a coil spring in said support, supporting means for said spring supported on said projection, a ball-socket supported on said spring and having a peripheral portion slidably guided in said tubular support, said ball-socket being disposed above said internal projection and said supporting means for the spring, a seat bracket having a ball-swivel engaging said ball-socket and supported thereby in said tubular support, and an arresting shoulder in said tubular support engageable by said ball-socket to arrest the same after a predetermined downward movement thereof.

References Cited in the file of this patent

UNITED STATES PATENTS

| | | |
|---|---|---|
| 151,893 | Mabett | June 9, 1874 |
| 650,941 | Kramer | June 5, 1900 |
| 1,897,676 | Ries | Feb. 14, 1933 |
| 2,516,801 | Renaud | July 26, 1950 |